C. B. SCHOENMEHL.
PRIMARY BATTERY.
APPLICATION FILED MAR. 17, 1911.

1,044,922.

Patented Nov. 19, 1912.

Witnesses
Ivan L. Morehouse
Ruth M. Wolden

Inventor
Charles B. Schoenmehl
By Chamberlain & Newman
Attorneys

COLUMBIA PLANOGRAPH CO., WASHINGTON, D. C.

UNITED STATES PATENT OFFICE.

CHARLES B. SCHOENMEHL, OF WATERBURY, CONNECTICUT.

PRIMARY BATTERY.

1,044,922.   Specification of Letters Patent.   Patented Nov. 19, 1912.

Application filed March 17, 1911. Serial No. 615,015.

*To all whom it may concern:*

Be it known that I, CHARLES B. SCHOENMEHL, citizen of the United States, and resident of Waterbury, in the county of New Haven and State of Connecticut, have invented certain new and useful Improvements in Primary Batteries, of which the following is a specification.

This invention relates to improvements in circular or annular forms of primary battery electrodes and more especially to improvements upon that type of batteries shown in my prior patents dated March 21, 1911 and numbered 987,647 and 987,648.

It is the purpose of the invention to provide an improved form of centrally suspended zinc electrode to take the place of the zinc rod form of electrode shown in said patents, and also to provide an improved form of cap for inclosing the negative electrode and for engaging the inner and outer perforated sheets that support the copper electrode, further to provide means whereby the said parts are insulatively connected, and suspended by a single suspending rod from the cover of a jar.

Upon the accompanying drawings forming a part of this specification similar characters of reference will be found to designate like or corresponding parts throughout the several figures, and of which—

Figure 1:
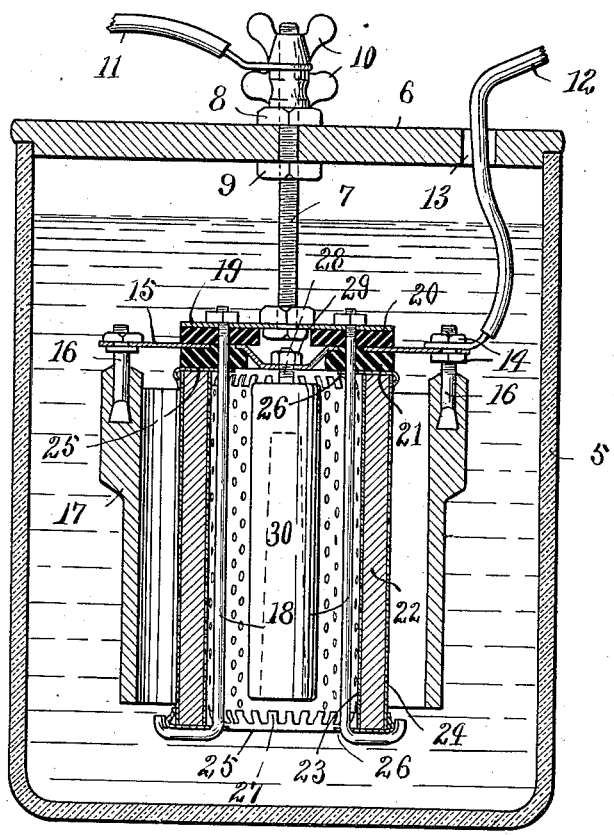
Figure 2:
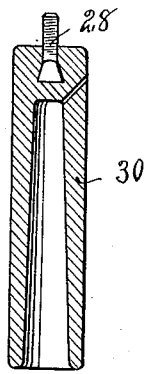
Figure 3:
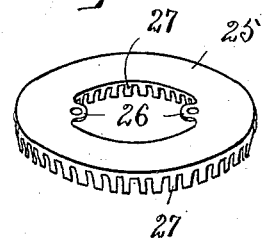

Figure 1, shows a central vertical sectional view through my improved form of battery complete. Fig. 2, is a central vertical longitudinal section of the improved form of internal zinc electrode detached. Fig. 3, is a detached perspective view of the improved form of end caps employed on the two ends of the negative electrodes.

Referring by numeral to the details of construction it will be noted that 5 indicates a battery jar designed to contain a solution and in which the assembled element is suspended from the cover 6. The cover is provided with a central hole through which the threaded suspending rod 7 passes for its attachment to the cover by means of the nuts 8 and 9. The thumb nuts 10 upon the rod 7 serve for the attachment of the field wire 11 which thus connects with the negative side of the battery, while the second field wire 12 passing through the hole 13 of the cover similarly connects with the opposite pole or positive side 14 of the battery as shown in Fig. 1.

A metal bridge piece 15 extends centrally across the top end of the elements and is connected at each end with the posts 16 molded in the outer cylindrical zinc electrode 17 and serves to support the copper oxid electrode from the before mentioned suspending rod 7 through the medium of rods 18 and a plate 19. The said plate 19 is secured to the lower end of the suspending rod 7 and extends outward therefrom in opposite directions for the attachment of the before mentioned rods 18 which are connected therewith, but which are insulatively passed through the before mentioned bridge piece 15. Upper insulating washers 20 are arranged between the said bridge and plate while similar washers 21 serve to similarly and insulatively connect the negative electrode with said bridge piece.

The negative electrode 22 may be either formed solid of compressed oxid of copper, or it may be made up of finely granulated oxid of copper scale. In either case it is of an annular form and contained intermediate of an inner and outer perforated metal wall 23 and 24. The upper and lower ends being inclosed by an annular form of metal cap 25 as shown in Figs. 1 and 3. Suitable ears 26 with a hole therethrough are formed upon the inner edge of these caps, through which the rods 18 are threaded for the purpose of securing the said caps in position, and for the further purpose of supporting the said negative element from the bridge, plate and suspending rod 7. The upper and lower annular caps 25 are each provided with inner and outer serrated edge portions 27 which are turned in and deflected to insure their firm engagement with the sides of the before mentioned perforated metal walls 23 and 24 so as to firmly bind the same against the copper and thus insure a positive mechanical and electrical connection as is particularly desirable at those points.

The lower ends of the rods 18 are bent out under the cap and negative electrode in a way to support the same and draw the element up firmly against the insulating washers attached to the said rods and beneath the cross strips. The central portion of the cross strip 15 is bent down and punched out to receive the screw 28 and nut 29 as shown in Fig. 1. The screw is embedded in and formed integral with the inner positive zinc electrode 30 which like the outer positive electrode is of an annular construction, being provided with both an inner and outer wall that is exposed to the solution. This zinc element as shown is of a somewhat larger diameter than the central or penciled zinc shown in the before mentioned patents and thus its peripheral surface is the same distance from the inner wall of the negative electrode as the inner wall of the outer positive electrode is from the outer wall of the negative electrode, thereby insuring an equal action of the solution on all these adjacent walls, during the operation of the battery, and thereby producing a much higher efficiency than is possible to obtain with a common form of cylindrical element battery having a comparatively small solid zinc rod disposed centrally within the cylindrical negative electrode.

Having thus described my invention what I claim and desire to secure by Letters Patent is—

1. In a battery of the class described, the combination with a cylindrical copper oxid negative electrode, of a perforated metal wall arranged against the side thereof, caps to cover the ends of the copper oxid negative electrode and having inwardly disposed serrated edges extended against the side of the perforated sheet to hold the same in engagement with the copper oxid, means for pressing the said caps against the metal wall and ends of the negative electrode, positive electrodes insulatively connected to the said negative electrode, and means for supporting the same within a jar.

2. In a battery of the class described the combination with a cylindrical copper oxid negative electrode, of an inner and outer cylindrical wall for supporting said copper electrode, upper and lower caps to inclose the top and bottom of said negative electrode and having inwardly disposed and yieldable serrated edges to engage the sides of said walls, means for pressing the said caps against the ends of the negative electrode, positive electrodes insulatively connected to the said negative electrode, and means for supporting the same within a jar.

3. In a battery of the class described the combination with an annular cylindrical copper oxid negative electrode, of perforated metal walls arranged against the sides of said negative electrode, annular metal caps to cover the ends of the copper oxid negative electrode and having depending fingers disposed from both their inner and outer edge portions against the sides of the perforated sheets to hold the same in engagement with the copper oxid.

Signed at Bridgeport in the county of Fairfield and State of Connecticut this 10th day of March A. D., 1911.

CHARLES B. SCHOENMEHL.

Witnesses:
C. M. NEWMAN,
ARTHUR A. PAGE.

Copies of this patent may be obtained for five cents each, by addressing the "Commissioner of Patents, Washington, D. C."